(12) United States Patent
Cho

(10) Patent No.: US 6,843,930 B2
(45) Date of Patent: Jan. 18, 2005

(54) COMPOSITION OF REFRIGERANT MIXTURES FOR HIGH BACK PRESSURE CONDITION

(75) Inventor: Seung-Yon Cho, Daejeon-si (KR)

(73) Assignee: ACM Tech, Seoul (KR)

( * ) Notice: Subject to any disclaimer, the term of this patent is extended or adjusted under 35 U.S.C. 154(b) by 135 days.

(21) Appl. No.: 10/363,248
(22) PCT Filed: Sep. 6, 2001
(86) PCT No.: PCT/KR01/01507
§ 371 (c)(1),
(2), (4) Date: Mar. 5, 2003
(87) PCT Pub. No.: WO02/20690
PCT Pub. Date: Mar. 14, 2002

(65) Prior Publication Data
US 2004/0021124 A1 Feb. 5, 2004

(30) Foreign Application Priority Data
Sep. 6, 2000 (KR) .......... 2000-52676

(51) Int. Cl.$^7$ ................ C09K 5/00
(52) U.S. Cl. .............. 252/67; 252/68; 62/114
(58) Field of Search ........ 252/67, 68; 62/114

(56) References Cited

U.S. PATENT DOCUMENTS

| | | | |
|---|---|---|---|
| 5,294,359 A | 3/1994 | Singh et al. | 101/128.21 |
| 5,624,595 A | 4/1997 | Sato et al. | 252/68 |
| 5,788,886 A * | 8/1998 | Minor et al. | 252/364 |

FOREIGN PATENT DOCUMENTS

| | | |
|---|---|---|
| JP | 8-199158 | 8/1996 |
| JP | 9-59609 | 3/1997 |
| JP | 9-111230 | 4/1997 |
| JP | 11-199863 | 7/1999 |

* cited by examiner

Primary Examiner—Margaret Einsmann
Assistant Examiner—Eisa Elhilo
(74) Attorney, Agent, or Firm—Bachman & LaPointe, P.C.

(57) ABSTRACT

There is provided a composition of refrigerant mixtures for high back pressure condition, comprising propane, propylene or 1,1-difluoroethane and, optionally, additive selected from the group consisting of carbon dioxide, trifluoromethyl iodide and mixture thereof. The composition according to the present invention is environment-friendly and can be directly drop in the conventional refrigerator system adopting HCFC-22 refrigerant without any systemic change.

4 Claims, 1 Drawing Sheet

COMPOSITION OF REFRIGERANT MIXTURES FOR HIGH BACK PRESSURE CONDITION

FIELD OF THE INVENTION

The present invention relates to a composition of refrigerant mixtures for high back pressure condition, which is environment-friendly and can be directly dropped in the conventional refrigerator system adopting HCFC-22 refrigerant without any systemic change such that it can be effectively used as a substitution material for Freon refrigerant HCFC-22 which is the main cause of ozone layer destroy and green house effect of earth. More specifically, the present invention relates to the composition of refrigerant mixtures for high back pressure condition, containing a) propane, b) a refrigerant selected from the group consisting of propylene and 1,1-difluoroethane, and, optionally c) an additive selected from the group consisting of carbon dioxide ($CO_2$), trifluoromethyl iodide ($CF_3I$) and mixture thereof which prevents flammability of the hydrocarbon refrigerant and increases mobility of refrigerating oil and cooling capacity of the refrigerant. The composition according to the present invention is environmentally friendly, therefore minimizes destroy of the ozone layer and global green house effect. Further, it has many excellent properties such as high volumetric cooling capacity or the vapor pressure similar with HCFC-22 to minimize the systemic modification of the refrigerator systems adopting HCFC-22 refrigerant, and azeotropic characteristic to minimize the temperature grade during evaporation and condensation processes. The composition according to the present invention can be used in refrigerator systems for use in household and industrial air-conditioners.

DESCRIPTION OF THE BACKGROUND ART OF THE INVENTION

Refrigerating cycle is composed of a compressor, a condenser, an evaporator, an expansion valve, a dryer, an oil separator, a liquid separator, and so forth. Based on the $2^{nd}$ law of thermodynamics, the refrigerator absorbs heat from the low heat supply and emits it to the high heat supply with the assistance of the compressor's work. Refrigerant used in the refrigeration cycle absorbs the heat from the surrounding and evaporates in the evaporator under low temperature. In the compressor, the refrigerant is compressed to the gas having high temperature and high pressure and then, it is cooling again in the condenser and the phase thereof is changed to the liquid having high pressure. Finally, the pressure thereof is decreased to the initial value on passing through the expansion valve. During these cycles, the heat is transferred from the low heat supply, i.e., surrounding to the high heat supply and the refrigerant performs continuous cooling of the surrounding.

According to operation temperature, the refrigerant is classified into 3 classes: a refrigerant for low back pressure condition, a refrigerant for high back pressure condition, and a refrigerant for middle back pressure condition. The refrigerant for low back pressure condition operates at a temperature of $-35 - -15°$ C. The refrigerant for middle back pressure condition and the refrigerant for high back pressure condition are $-15 - +5°$ C. and $-10 - +10°$ C., respectively. As a representative example of the refrigerant for high back pressure condition, HCFC-22 (simply, R-22), one of HCFC (Hydrochlorofluorocarbon) refrigerant, can be mentioned. Due to its excellent thermodynamic properties, HCFC-22 has being widely used in refrigerators such as household and industrial air-conditioner. However, the use thereof is strictly restricted for being an environmentally hazardous material having high ozone layer destroy potential (ODP=0.05) and global warming potential (GWP=1500).

For these reasons, the development of HCFC-22 substitution refrigerants has been continuously progressed. R-502, which is a mixture of CFC (chlorofluorocarbon) refrigerants, R-407C and R410A, which are mixtures of HFC (hydrofluorocarbon) refrigerants, and R290, which is HC (Hydrocarbon) refrigerant, were suggested as substitution refrigerants for HCFC-22.

R-502 is an azeotropic mixture of $CHF_2Cl$ and $CF_2ClCF_3$, which is a mixture of two refrigerants but acts as a single refrigerant, but there are questions as to the environmental safety such that the use thereof is strictly restricted.

R-407 is a non-azeotropic mixture of three refrigerants, R-32($CH_2F_2$)/R-125 ($C_2HF_5$)/R-134a($CF_3CH_2F$) in which the ratio of the refrigerants is 23/25/52 wt % and its volumetric cooling capacity is almost equal to that of HCFC-22. However, this refrigerant composition is suffered from the disadvantages that it has 8.1% higher condensing and evaporating pressure than HCFC-22 and the coefficient of performance thereof is lower than HCFC-22. In addition, because of its non-azeotropic characteristic, about 4–5° C. of the temperature grade is occurred during the evaporating and condensing process. Due to phase change of the refrigerator, this results performance deviation even the same amount of the refrigerant is introduced into a refrigerator. Further, Because of its poor compatibility with a refrigerating oil, special oils like ester oils or poly alkylene glycol (PAG) oils are necessarily required rather than mineral oils. However, the ester oils or PAG oils may cause significant damages to a refrigerator by the absorption of moisture when they are exposed to the air. For these reasons, they cannot be directly dropped in the refrigerator systems adopting HCFC-22 refrigerant. That is, systemic changes of the conventional refrigerator such as a compressor and the manufacturing equipments are necessarily required. Also, this refrigerant composition is not environment-friendly. Specifically, the global warming potential (GWP) of R-407 is about 1530 ($CO_2$=1, 100 yr), which is very high.

R-401A which is a mixture of 50 wt % of R-32 ($CH_2F_2$) and 50 wt % of R-125 ($C_2HF_5$) is an azeotropic mixture in which temperature grade does not occur during evaporation and condensation. This refrigerant composition has higher volumetric cooling capacity than HCFC-22. However, the composition cannot be directly dropped in the conventional refrigerator systems adopting HCFC-22 refrigerant without any systemic changes or modifications, because the condensing and evaporating pressures are 56% higher than that of HCFC-22. Further, the composition also suffers from disadvantages that special oils like ester oils or poly alkylene glycol (PAG) oils are necessarily required rather than mineral oils and the global warming potential (GWP) thereof is about 1730 such that it is not environment-friendly.

R-290 that is a hydrocarbon refrigerant has been actively researched as a substitution refrigerant for the HCFC-22, because of its excellent thermodynamic properties and low global warming potential, specifically 3 ($CO_2$=1, 100 yr). Despite of its excellent thermodynamic properties, it suffers from disadvantages that it requires systemic changes or modifications on refrigerator systems such as a compressor because of its high volumetric cooling capacity. Further, it may also be susceptible to flammability and explosiveness. In addition, Non-azeotropic refrigerant of propane and pentafluoroethane ($C_2HF_5$) having high volumetric cooling capacity cannot be directly dropped in the conventional refrigerator because it has much higher vapor pressure than HCFC-22. 2–3° C. of temperature grade occurs during condensing and evaporating processes. That is, neither R-290 nor Non-azeotropic refrigerant of propane and pentafluoroethane ($C_2HF_5$) is applied to the conventional refrigerator systems without any systemic changes.

Meanwhile, U.S. Pat. No. 5,624,595 disclosed a refrigerant composition comprising silicone oil as an additive in order to improve flammability of the refrigerant. However, the amount of silicone oil added is strictly restricted because it circles through the refrigerating cycle as liquid state and reduces the cooling capacity and accumulation thereof in the evaporator may cause significant damages to the refrigerator. Further, since it is separated from the refrigerant while it is stored for a long time after being manufactured, the improvement in flammability is relatively high when the real refrigerant is discharged as a gas from the vessel.

As a result, in order to use the refrigerants suggested in the above, systemic changes or modifications of the refrigerator systems adopting HCFC-22 refrigerant is necessarily required for the reason that they have different properties than HCFC-22 This systemic changes waste enormous cost and resources and the cost required for modifying manufacturing equipments is incalculably high.

Therefore, it has been demanded to develop new azeotropic refrigerant, which could be directly dropped in the conventional refrigerator systems in which HCFC-22 was used as a refrigerant such that systemic changes can be minimized, which has excellent volumetric cooling capacity, high performance coefficient, and evaporating pressure feature without showing temperature grade during evaporating and condensing processes, and which is compatible with components of the refrigerator system such as refrigerating oil.

SUMMARY OF THE INVENTION

Therefore, the object of the present invention is to provide a composition of refrigerant mixture for high back pressure condition, which is environmentally friendly and is applied, with the adjustment of the amount of the refrigerant, directly to the conventional refrigerator systems adopting HCFC-22 refrigerant without any systemic change.

Another object of the present invention is to provide a composition of refrigerant mixture for high back pressure condition which has excellent coefficient of performance and safety to environment and human, condensing and evaporating pressures almost identical to that of HCFC-22, excellent compatibility with a refrigerating oil, and enhanced non-flammability and non-explosiveness.

The objects and other objects described in the description can be achieved by providing a composition of refrigerant mixture for high back pressure condition, containing a) propane, b) a refrigerant selected from the group consisting of propylene and 1,1-difluoroethane, and, optionally c) an additive selected from the group consisting of carbon dioxide ($CO_2$), trifluoromethyl iodide ($CF_3I$) and mixture thereof which prevents flammability of the hydrocarbon refrigerant and increases mobility of refrigerating oil and cooling capacity of the refrigerant.

According to the first aspect of the present invention, there is provided a composition of refrigerant mixture for high back pressure condition containing 20–45 wt % of propane and 55–80 wt % of propylene, and, optionally less than 5 wt % of an additive selected from the group consisting of carbon dioxide ($CO_2$), trifluoromethyl iodide ($CF_3I$) and mixture thereof which prevents flammability of the hydrocarbon refrigerant and increases mobility of refrigerating oil and cooling capacity of the refrigerant.

According to the second aspect of the present invention, there is provided a composition of refrigerant mixture for high back pressure condition containing 50–70 wt % of propane and 30–50 wt % of 1,1-difluoroethane, and, optionally less than 5 wt % of an additive selected from the group consisting of carbon dioxide ($CO_2$), trifluoromethyl iodide ($CF_3I$) and mixture thereof which prevents flammability of the hydrocarbon refrigerant and increases mobility of refrigerating oil and cooling capacity of the refrigerant.

According to the third aspect of the present invention, there is provided a refrigerator system comprising as a refrigerant the composition of refrigerant mixture for high back pressure condition.

DETAILED DESCRIPTION OF THE INVENTION

The present invention relates to a composition of refrigerant mixture for high back pressure condition, which is environment-friendly and can be directly dropped in refrigerator systems adopting HCFC-22 refrigerant, which is main cause of destruction of ozone layer and of induction of green house effect of earth, The composition according to the present invention contains a) propane, b) a refrigerant selected from the group consisting of propylene and 1,1-difluoroethane, and, optionally c) an additive selected from the group consisting of carbon dioxide ($CO_2$), trifluoromethyl iodide ($CF_3I$) and mixture thereof which prevents flammability of the hydrocarbon refrigerant and increases mobility of refrigerating oil and cooling capacity of the refrigerant.

More specifically, the first composition according to the present invention contains 20–45 wt % of hydrocarbon refrigerant propane ($C_3H_8$) and 55–80 wt % of hydrocarbon propylene ($CH_3$—$CH$=$CH_2$).

The second composition according to the present invention contains 50–70 wt % of hydrocarbon refrigerant propane ($C_3H_8$) and 30–50 wt % of hydrofluorocarbon refrigerant propylene ($CH_3$—$CH$=$CH_2$).

In order to prevent flammability of the hydrocarbon refrigerant and to increase mobility of refrigerating oil and cooling capacity of the refrigerant, an additive selected from the group consisting of carbon dioxide ($CO_2$), trifluoromethyl iodide ($CF_3I$) and mixture thereof can be added to the compositions in an amount of less than 5 wt %, based on the total weight of the refrigerant composition.

According to the particular preferred embodiment of the present invention, the composition comprising 32–33 wt % of propane, 65–67 wt % of propylene, and 1–2 wt % of an additive selected from the group consisting of carbon dioxide, trifluoromethyl iodide and mixture thereof, based on the total weight of the refrigerant composition; 55–57 wt % of propane, 41–43 wt % of 1,1-difluoroethane and 1–2 wt % of an additive selected from the group consisting of carbon dioxide, trifluoromethyl iodide and mixture thereof, based on the total weight of the refrigerant composition is more preferable.

According to another preferred embodiment of the present invention, addition of 1.5 wt % and 5 wt % of the additive, carbon dioxide ($CO_2$) or trifluoromethyl iodide ($CF_3I$), which is used to prevent flammability of the hydrocarbon refrigerant and to improve volumetric cooling capacity and mobility of the refrigerant oil in the evaporator, raised the ignition point of the refrigerant up to about 20–35% and about 36–45%, respectively, and the ignition point was increased in proportional to the content thereof. However, since the excess content of the carbon dioxide ($CO_2$) and/or trifluoromethyl iodide ($CF_3I$) could higher the cooling capacity, it is desirable for the composition to contain less than 5 wt % of the additive, based on the total weight of refrigerant mixture.

According to another preferred embodiment of the present invention, the composition according to the present invention suggested as a substitute for HCFC-22 had excellent thermodynamic characteristics (for example, excellent cooling capacity and high coefficient of performance, compared to HCFC-22 refrigerant, which is the most important characteristic of a refrigerant) and improved safety and environmental safety (for example, ozone destroying potential=0, global warming effect=minimum).

According to further preferred embodiment of the present invention, the composition according to the present invention had a similar level of vapor pressure (evaporating/condensing pressure) with HCFC-22 such that the composition can be directly dropped in the conventional refrigerator systems adopting HCFC-22 refrigerant without any systemic change or modification. Therefore, the composition provides additional advantages that the HCFC-22 refrigerator systems can be re-used without any systemic change.

According to further preferred embodiment of the present invention, the composition according to the present invention exhibited an azeotropic behavior in which the temperature grade did not occur. Therefore, due to the continuous pressure change in the evaporator and the condenser, the composition can prevent the instability of the system, compared with the non-azeotropic refrigerants. The maintenance of the refrigerant can be also convenient in the manufacturing field.

The composition according to the present invention can be prepared by removing air from an airtight vessel with a vacuum pump, followed by introducing the hydrocarbon refrigerant propane, and either propylene or 1,1-difluoroethane into the vessel and mixing the refrigerant mixture for a certain time. If necessary, carbon dioxide ($CO_2$) and trifluoromethyl iodide ($CF_3I$) can be added to the mixture in order to prevent flammability of the hydrocarbon refrigerant and to increase mobility of the refrigerating oil in the evaporator and volumetric cooling capacity of the refrigerant composition. The obtained product can be put into valve-equipped gas vessels and shipped. These processes can be performed at normal temperature.

According to the preferred embodiment of the present invention, the composition according to the present was proven to have high coefficient of performance and volumetric cooling capacity. As thus, it can be widely used in the refrigerator systems composed of a compressor, a condenser, and an expansion valve, and an evaporator. It can be also used in refrigerator systems equipped with an oil separator and a liquid separator additionally. Especially, the composition exhibits similar behaviors with HCFC-22 in terms of vapor pressure, such that it can be directly dropped without any systemic change or modification in the conventional refrigerator systems in which HCFC-22 is used as a refrigerant, comprising reciprocal, rotary or scrolling compressor.

Further, since the composition has the excellent compatibility with the refrigerating oil which is used in order to prevent the abrasion of the parts such as a compressor, various refrigerating oils defined in the standard (ISOVG 10–50) of the International Standards Organization (ISO) can be widely used. Especially, differently from R-407C and R-401A, mineral oils, which have been used most widely, can be used as a refrigerating oil.

The composition according to the present invention is also applicable to the refrigerators adopting the heat pump method, where the heat emitted from the condenser of the refrigerating cycle is used as the heating source. For example, the composition can be applied to the heat pump air-conditioner, which can be used for heating and cooling, by obtaining heat from the air in an evaporator located in the outdoor, and then warming the air in the indoor with the heat emitted from a condenser.

Figure 1:
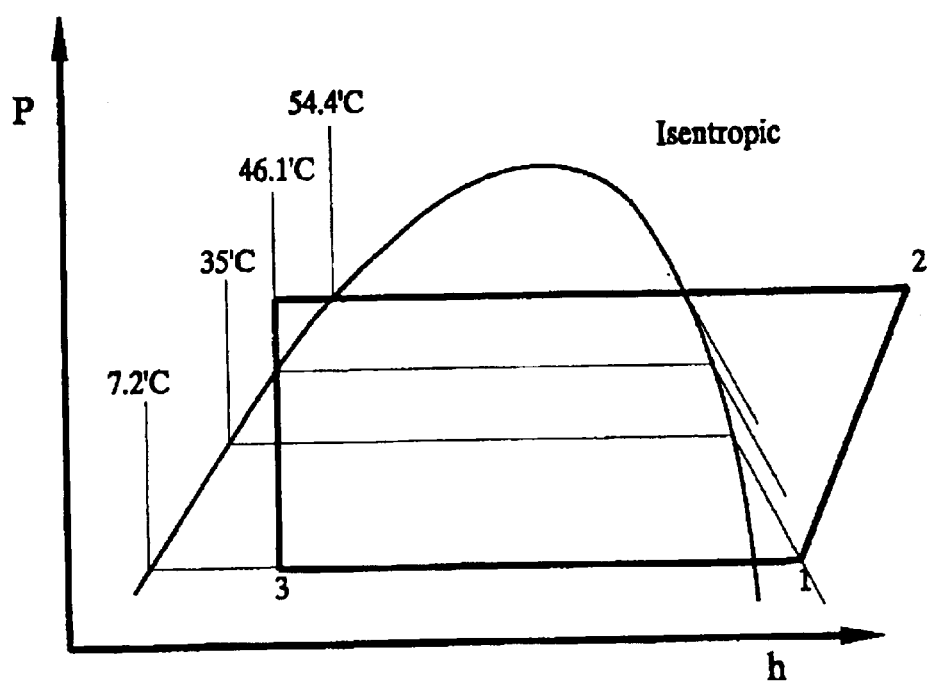
FIG. 1 is a pressure-enthalpy diagram in which the characteristics of azeotropic refrigerants were measured and analyzed.

The present invention will be described in more detail referring to the following Examples and drawing, but it should be understood that the scope of the present invention is not limited thereto.

EXAMPLE

Example 1a

The first five compositions of refrigerant mixture for high back pressure condition were prepared by the method described above. The formulations are summarized in the Table 1a:

TABLE 1a

| Recipe | $CH_3CH_2CH_3$ | $CH_3CH=CH_2$ | Additive $CO_2$ | $CF_3I$ |
|---|---|---|---|---|
| Recipe 1 (SR-20a) | 32.5 | 66.0 | 1.5 | |
| Recipe 2 (SR-20b) | 32.5 | 66.0 | | 1.5 |
| Recipe 3 (SR-20c) | 30.0 | 70.0 | | |
| Recipe 4 (SR-20d) | 19.7 | 78.8 | 1.5 | |
| Recipe 5 (SR-20e) | 44.3 | 54.2 | | 1.5 |

Example 2

The second five compositions of refrigerant mixture for high back pressure condition were prepared by the method described above. The formulations are summarized in the Table 1b:

TABLE 1b

| Recipe | $CH_3CH_2CH_3$ | $CHF_2CH_3$ | Additive $CO_2$ | $CF_3I$ |
|---|---|---|---|---|
| Recipe 6 (SR-20f) | 56.5 | 42.0 | 1.5 | |
| Recipe 7 (SR-20g) | 56.5 | 42.0 | | 1.5 |
| Recipe 8 (SR-20h) | 60.0 | 40.0 | | |
| Recipe 9 (SR-20i) | 49.3 | 49.2 | 1.5 | |
| Recipe 10 (SR-20j) | 69.0 | 29.5 | | 1.5 |

Example 3

The thermodynamic properties of the recipes 1 to 10 (hereinafter, SR-20a to 20j) obtained from Examples 1 and 2, such as boiling point, toxicity data, ignition temperature, thermal conductivity, heat of evaporation, ozone layer destroy potential (ODP), and global warming potential (GWP) were measured and compared to R-22, R-407C, R-410A and R-290 in Tables 2a and 2b:

perature and so on were analyzed with theoretical cycle. The standard conditions of the theoretical cycle such as condensation temperature, evaporation temperature, super-cooled temperature, super-heated gas temperature, and surrounding temperature of the compressor were shown in FIG. 1.

TABLE 2a

| | Refrigerant | | | | | | |
|---|---|---|---|---|---|---|---|
| Item | R22 | R407C | R410A | R290 | SR-20b | SR-20c | SR-20d |
| Chemical Formula | $CHF_2Cl$ | HFC-Mixture | HFC-Mixture | $C_3H_8$ | HC-Mixture | HC-Mixture | HC-Mixture |
| Molecular Weight | 86.5 | 95.2 | 86.0 | 44.1 | 45.0 | 43.3 | 42.6 |
| Boiling Point (° C.) | −40.8 | −44.0 | −49.9 | −42.1 | −43.5 | −44.5 | −41.8 |
| Toxicity | None | None | None | None | None | None | None |
| Ignition Temp. (° C.) | None | None | None | 470 | 690 | 470 | 680 |
| Thermal Conductivity (W/m K) | | | | | | | |
| Liquid | 0.097 | 0.103 | 0.115 | 0.1064 | 0.109 | 0.109 | 0.109 |
| Vapor | 0.010 | 0.011 | 0.012 | 0.0163 | 0.015 | 0.015 | 0.015 |
| Heat of Vapor (kJ/kg) [at 0° C.] | 202.4 | 216.4 | 234.6 | 374.5 | 370.5 | 371.7 | 372.9 |
| Lubrication Oil | Mineral | Ester | Ester | Mineral | Mineral | Mineral | Mineral |
| ODP | 0.05 | 0 | 0 | 0 | 0 | 0 | 0 |
| GWP ($CO_2$ = 1, 100 yr) | 1500 | 1530 | 1730 | 3 | 3 | 3 | 3 |

TABLE 2b

| | Refrigerant | | | | | | |
|---|---|---|---|---|---|---|---|
| Item | R22 | R407C | R410A | R290 | SR-20f | SR-20h | SR-20j |
| Chemical Formula | $CHF_2Cl$ | HFC-Mixture | HFC-Mixture | $C_3H_8$ | HC-Mixture | HC-Mixture | HC-Mixture |
| Molecular Weight | 86.5 | 95.2 | 86.0 | 44.1 | 53.3 | 52.8 | 52.9 |
| Boiling Point (° C.) | −40.8 | −44.0 | −49.9 | −42.1 | −33.5 | −34.9 | −36.7 |
| Toxicity | None | None | None | None | None | None | None |
| Ignition Temp. (° C.) | None | None | None | 470 | 715 | 550 | 705 |
| Thermal Conductivity (W/m K) | | | | | | | |
| Liquid | 0.097 | 0.103 | 0.115 | 0.1064 | 0.109 | 0.109 | 0.109 |
| Vapor | 0.010 | 0.011 | 0.012 | 0.0163 | 0.015 | 0.015 | 0.015 |
| Heat of Vapor (kJ/kg) [at 0° C.] | 202.4 | 216.4 | 234.6 | 374.5 | 312.7 | 314.5 | 326.2 |
| Refrigerating Oil | Mineral | Ester | Ester | Mineral | Mineral | Mineral | Mineral |
| ODP | 0.05 | 0 | 0 | 0 | 0 | 0 | 0 |
| GWP ($CO_2$ = 1, 100 yr) | 1500 | 1530 | 1730 | 3 | 60 | 58 | 43 |

As shown in Tables 2a and 2b, the compositions according to the present invention, SR-20a to 20e had superior thermal conductivity and heat of evaporation to the Freon refrigerants such as R-22, R-407C and R-410 and the values of ODP and GWP were very low such that the composition were environment-friendly, and low molecular weight enables to reduce the amount added. Further, mineral oils could be used in the composition as a refrigerating oil. The composition had higher ignition point compared to the hydrocarbon refrigerants (R-290)

Example 4

To investigate the possibility of the compositions according to the present invention (SR-20 Series) suggested as a substitute for HCFC-22, volumetric cooling capacity, coefficient of performance, condensing and evaporating pressures, compression ratio, temperature grade, outgas tem- To analyze the theoretical cycle characteristics, a refrigerant property program, NIST REFPROP 5.1 from U.S.A was used which was developed. N order to calculate the thermodynamic characteristics of the composition of refrigerant mixtures (SR-20 Series) according to the present invention, the equilibrium experimental apparatus was used to measure saturated temperature-pressure characteristics. A new mutual operating coefficient in the suitable temperature to minimize errors of the experimental data was introduced and estimated. And then, CSD (Carnahan/Starling/DeSantis) state equation and thermodynamic equations was used to calculate the physical properties of the compositions of refrigerant mixture.

Based on the 100% volumetric efficiency of the compressor, the results obtained from the program referred above were shown in Tables 3a and 3b:

TABLE 3a

Theoretical performance of refrigerants in ASHRAE LBP conditions

|  | R-22 | R407C | R410A | R290 | R1270 | SR-20b | SR-20c | SR-20d |
|---|---|---|---|---|---|---|---|---|
| Cond. Mid Temp. (° C.) | 54.4 | 54.4 | 54.4 | 54.4 | 54.4 | 54.4 | 54.4 | 54.4 |
| Cond. Mid Press. ($P_c$) (kPa) | 2141 | 2316 | 3350 | 1883 | 2267 | 2156.0 | 2188.5 | 2203.5 |
| Inlet (Vapor) Temp. (° C.) | 54.4 | 56.66 | 54.46 | 54.4 | 54.4 | 54.45 | 54.44 | 54.50 |
| Outlet (liquid) Temp. (° C.) | 54.4 | 52.12 | 53.41 | 54.4 | 54.4 | 54.35 | 54.36 | 54.30 |
| Cond. Temp. Gradient (° C.) | 0 | 4.54 | 0.15 | 0 | 0 | 0.1 | 0.08 | 0.2 |
| Evap. Mid Temp. (° C.) | 7.2 | 7.2 | 7.2 | 7.2 | 7.2 | 7.2 | 7.2 | 7.2 |
| Evap. Mid Press. ($P_e$) (kPa) | 621.8 | 635 | 996.5 | 587.5 | 725 | 685.1 | 696.3 | 701.3 |
| Inlet (Liquid + Vapor) Temp. (° C.) | 7.2 | 4.8 | 7.14 | 7.2 | 7.2 | 7.15 | 7.16 | 7.30 |
| Outlet (Vapor) Temp. (° C.) | 7.2 | 9.6 | 7.26 | 7.2 | 7.2 | 7.25 | 7.24 | 7.10 |
| Evap. Temp. Gradient (° C.) | 0 | 4.8 | 0.12 | 0 | 0 | 0.10 | 0.08 | 0.20 |
| Pressure Ratio ($P_c/P_e$) | 3.44 | 3.67 | 3.36 | 3.21 | 3.13 | 3.15 | 3.14 | 3.14 |
| Discharge Temp. (° C.) | 100.9 | 94.2 | 102.2 | 83.8 | 90.45 | 88.9 | 89.4 | 89.7 |
| Suction Gas Density (kg/m$^3$) | 23.07 | 23.24 | 31.7 | 11.12 | 13.39 | 12.77 | 12.92 | 12.99 |
| Volumetric Capacity (kJ/m$^3$) | 3908.0 | 4063.1 | 5905.7 | 3420.5 | 4093.3 | 3903.7 | 3961.3 | 3990.5 |
| Evaporation Capacity (kJ/kg) | 169.4 | 174.8 | 186.3 | 307.6 | 305.7 | 305.7 | 306.6 | 307.2 |
| COP (W/W) | 4.80 | 4.76 | 4.59 | 4.91 | 4.80 | 4.80 | 4.82 | 4.82 |

TABLE 3b

Theoretical performance of refrigerants in ASHRAE LBP conditions

|  | R-22 | R407C | R410A | R290 | R152a | SR-20f | SR-20h | SR-20j |
|---|---|---|---|---|---|---|---|---|
| Cond. Mid Temp. (° C.) | 54.4 | 54.4 | 54.4 | 54.4 | 54.4 | 54.4 | 54.4 | 54.4 |
| Cond. Mid Press. ($P_c$) (kPa) | 2141 | 2316 | 3350 | 1883 | 1312 | 2142 | 2161 | 2125 |
| Inlet (Vapor) Temp. (° C.) | 54.4 | 56.66 | 54.46 | 54.4 | 54.4 | 54.45 | 54.41 | 54.66 |
| Outlet (liquid) Temp. (° C.) | 54.4 | 52.12 | 53.41 | 54.4 | 54.4 | 54.35 | 54.39 | 54.16 |
| Cond. Temp. Gradient (° C.) | 0 | 4.54 | 0.15 | 0 | 0 | 0.1 | 0.02 | 0.5 |
| Evap. Mid Temp. (° C.) | 7.2 | 7.2 | 7.2 | 7.2 | −23.3 | 7.2 | 7.2 | 7.2 |
| Evap. Mid Press. ($P_e$) (kPa) | 621.8 | 635 | 996.5 | 587.5 | 104.6 | 680.2 | 680.5 | 670.2 |
| Inlet (Liquid + Vapor) Temp. (° C.) | 7.2 | 4.8 | 7.14 | 7.2 | −23.3 | 7.25 | 7.21 | 6.95 |
| Outlet (Vapor) Temp. (° C.) | 7.2 | 9.6 | 7.26 | 7.2 | −23.3 | 7.15 | 7.19 | 7.45 |
| Evap. Temp. Gradient (° C.) | 0 | 4.8 | 0.12 | 0 | 0 | 0.10 | 0.02 | 0.50 |
| Pressure Ratio ($P_c/P_e$) | 3.44 | 3.67 | 3.36 | 3.21 | 12.54 | 3.15 | 3.17 | 3.17 |
| Discharge Temp. (° C.) | 100.9 | 94.2 | 102.2 | 83.8 | 137.6 | 88.6 | 87.2 | 86.6 |
| Suction Gas Density (kg/m$^3$) | 23.07 | 23.24 | 31.7 | 11.12 | 2.778 | 12.69 | 15.09 | 14.3 |
| Volumetric Capacity (kJ/m$^3$) | 3908.0 | 4063.1 | 5905.7 | 3420.5 | 192.5 | 3875.5 | 3838.0 | 3782.0 |
| Evaporation Capacity (kJ/kg) | 169.4 | 174.8 | 186.3 | 307.6 | 69.3 | 305.4 | 254.4 | 264.5 |
| COP (W/W) | 4.80 | 4.76 | 4.59 | 4.91 | 2.69 | 4.82 | 4.76 | 4.78 |

As shown in Tables 2 and 3 refrigerant R-407C suggested as a substitute for HCFC-22 has zero value of ozone layer destroy potential and high cooling capacity, but this refrigerant had high global warming potential, specifically 1530, and special ester oils should be used as a refrigerant oil rather than mineral oils. Further it has low coefficient of performance, and 8% higher evaporating and condensing pressures that HCFC-22, and exhibited non-azeotropic behavior in which 4.5–4.8° C. of the temperature grade occurred. R-410A showed improved azeotropic behavior, but the global warming potential was 1730, and ester oils rather than mineral oils should be used as a refrigerant oil. Volumetric cooling capacity thereof was proven to be more excellent than HCFC-22, but the vapor pressure behavior was 56% higher that HCFC-22, which prohibit direct application of the refrigerant to the HCFC-22 refrigerator systems. However, the composition according to the present invention, SR-20 series had lower global warming potential and higher volumetric cooling capacity and coefficient of performance than HCFC-22. Further, they showed similar vapor pressure behavior with HCFC and an azeotropic behavior in which temperature grade did not occur.

Example 5

With the second refrigerant calorimeter described on the Korean Industrial Standard (KS B 6365-1987), various capacities for SR-20b, SR-20c, SR-20f and SR-20h prepared in Examples 1 and 2 were measured and compared to R-22 and R-407C that are high back pressure refrigerants. The results thereof were summarized in Table 4:

TABLE 4

The Capacities of the refrigerants from calorimeter under ASHRAE LBP condition

| Refrigerant | Capacity (kcal/hr) | Input (W) | COP (W/W) | Current (A) | Evap./Cond. Temp. Glide (° C.) | Remark |
|---|---|---|---|---|---|---|
| R22 | 1402.0 | 535.0 | 3.046 | 2.48 | 0/0 | Compressor: |
| R407C | 1435.8 | 555.0 | 3.004 | 2.59 | 4.8/4.6 | 44A056IVI |
| SR-20b | 1407.5 | 534.1 | 3.062 | 2.47 | 0.0/0.1 | 7.99CC/Rev |
| SR-20c | 1428.2 | 540.6 | 3.070 | 2.49 | 0.0/0.05 | |
| SR-20f | 1395.5 | 531.1 | 3.053 | 2.45 | 0.0/0.08 | Refrig. Oil |
| SR-20h | 1383.0 | 525.2 | 3.060 | 2.45 | 0.0/0.02 | SUNISO 4GS |

As shown in Table 4, R-407A showed high cooling capacity, but the vapor pressure are higher than HCFC-22 such that it required high input potential and this reduced the coefficient of performance. In the meanwhile, R-410 was not tested because no compress used for HCFC-22 refrigerant satisfies such high vapor pressure. However, the composition according to the present invention, SR-20 series showed very excellent characteristic such as the excellent cooling capacity and coefficient of performance, and the required electric current was compared to HCFC-22. As shown in the experimental results for temperature grade on the evaporating/condensing processes, the composition of refrigerant mixture for high back pressure condition, SR-20 Series, has similar to the single refrigerant and very excellent azeotropic behavior in the level of 0° C.~0.1° C. of temperature grade on evaporating/condensing processes. The composition according to the present invention, SR-20 Series with azeotropic behavior, excellent cooling capacity, and coefficient of performance satisfied the requirements to be applied directly to the HCFC-22 refrigerator systems.

Example 6

To the first refrigerant mixture consisting of 30 wt % of propane and 70 wt % of propylene and to the second refrigerant mixture consisting of 60 wt % of propane and 40 wt % of 1,1-difluoroethane, various amounts of carbon dioxide ($CO_2$) or trifluoromethyl iodide ($CF_3I$) was added, and then, temperature grade characteristic on the evaporating/condensing processes for each composition was measured. The Results thereof were summarized in Tables 5a and 5b:

TABLE 5a

| The first Refrigerant Composition | | | 0% | 1.5% | 5% | 10% | 20% | 30% | 40% | 50% |
|---|---|---|---|---|---|---|---|---|---|---|
| | $CF_3I$ | Mix. ratio (wt %) | 0% | 1.5% | 5% | 10% | 20% | 30% | 40% | 50% |
| | | Temp glide (° C.) | 0 | 0 | 0.02 | 0.7 | 1.2 | 1.8 | 2.0 | 2.5 |
| | $CO_2$ | Mix. ratio (weight %) | 0% | 1.5% | 5% | 10% | 20% | 30% | 40% | 50% |
| | | Temp glide (° C.) | 0 | 0 | 0.02 | 0.8 | 1.5 | 1.8 | 2.0 | 2.8 |

TABLE 5b

| The second Refrigerant Composition | | | 0% | 1.5% | 5% | 10% | 20% | 30% | 40% | 50% |
|---|---|---|---|---|---|---|---|---|---|---|
| | $CF_3I$ | Mix. ratio (weight %) | 0% | 1.5% | 5% | 10% | 20% | 30% | 40% | 50% |
| | | Temp grade (° C.) | 0 | 0 | 0.01 | 0.5 | 1.2 | 1.5 | 1.8 | 2.2 |
| | $CO_2$ | Mix. ratio (weight %) | 0% | 1.5% | 5% | 10% | 20% | 30% | 40% | 50% |
| | | Temp grade (° C.) | 0 | 0 | 0.01 | 0.7 | 1.4 | 1.6 | 1.9 | 2.5 |

As shown in Tables 5a and 5b, smaller than 0.02° C. of temperature grade on evaporating and condensing processes was observed, provided that the amount of an additive added was maintained less than 5 wt %. But, as the amount of the additive added exceeded 5 wt %, non-azeotropic behavior was observed.

Example 7

To test the reliability of the refrigerator system in which the compositions according to the present invention, SR-20 series, used as a refrigerant, an evaluating experiment for reliability is performed with a compressor. A overload friction test is performed based on the standard reliability test of GE company in United States and the experimental apparatus is composed of a single body condenser/evaporator, an air blower, an expansion valves, a capillary, a timer, and a pressure controller. This experimental apparatus makes the harsh experimental condition through the suction pressure and discharge pressure of the compressor and through temperature control of the compressor case in short time to inspect the reliability of the compressor. The suction pressure and discharge pressure were controlled by the expansion valve, the capillary tube, and the mobility of the refrigerant. Precise control of the pressure was achieved, by additionally controlling the revolution speed of a wind blow according to the sensed the temperature of the surface of the integrated condenser/evaporator. To minimize the size of this experimental apparatus, the evaporator and condenser are integrated and the wind blower is used to control the temperature of the compressor. After operating the compressor for a given time, a refrigerating oil was collected into a beaker and the total acid number, moisture, and color of the collected oil was measured. Finally, the compressor was taken apart and then, abrasion of mechanical part, flexibility of the organic material, and weight and size change on which the reliability of the refrigerator systems depended were measured.

The overloading friction experiment was performed to inspect mainly the friction abrasion state of the mechanical part of the compressor. Its experimental results are shown is Table 6. From the low total acid number, it was observer that the compositions of refrigerant mixture SR-20 Series with mineral oil (SUNISO-4GS) as a refrigerating oil had good compatibility with the mineral oil. Further, in terms of the abrasive characteristic, They showed almost the same result with HCFC-22

TABLE 6

| Item | Refrigerant Compressor Oil | | | | | |
|---|---|---|---|---|---|---|
| | R22 | R-407C 44A0561V1 | SR-20b | SR-20c | SR-20f 44A0561V1 | SR-20h |
| | Mineral (SUNISO-4GS) | | Ester (SUNISO-SL46) | | Mineral (SUNISO-4GS) | |
| Wear | No | No | No | No | No | No |
| Ref. Oil | | | | | | |
| Color (ASTM) | L1.0 | L1.5 | L1.0 | L1.0 | L1.0 | L1.0 |
| TAN(0.1 ↓) (mgKOH/g) | 0.008 | 0.010 | 0.005 | 0.003 | 0.006 | 0.004 |
| Water (20 ppm ↓) | 0 | 5 | 0 | 0 | 0 | 0 |

Example 8

To the first refrigerant mixture consisting of 30 wt % of propane and 70 wt % of propylene and to the second refrigerant mixture consisting of 60 wt % of propane and 40 wt % of 1,1-difluoroethane, various amounts of carbon dioxide ($CO_2$) or trifluoromethyl iodide ($CF_3I$) was added, and then, ignition temperature for each composition was measured. The Results thereof were summarized in Tables 7a and 7b. As shown in Tables 7a and 7b, the ignition temperature was remarkably increased by the addition of carbon dioxide ($CO_2$) or trifluoromethyl iodide ($CF_3I$). However, as the amount added exceeds 5 wt %, cooling capacity and COP might be reduced. Therefore, it is desirable to add these additives less than 5 wt %.

TABLE 7a

| The first Refrigerant Composition | $CF_3I$ | Mix. ratio (weight %) | 0% | 1.5% | 5% | 10% | 20% | 30% | 40% | 50% |
|---|---|---|---|---|---|---|---|---|---|---|
| | | Ignition Temp. (° C.) | 470 | 690 | 760 | 895 | 990 | 1100 | 1220 | None |
| | $CO_2$ | Mix. ratio (weight %) | 0% | 1.5% | 5% | 10% | 20% | 30% | 40% | 50% |
| | | Ignition Temp. (° C.) | 470 | 680 | 750 | 880 | 970 | 1070 | 1200 | None |

TABLE 7b

| The second Refrigerant Composition | $CF_3I$ | Mix. ratio (weight %) | 0% | 1.5% | 5% | 10% | 20% | 30% | 40% | 50% |
|---|---|---|---|---|---|---|---|---|---|---|
| | | Ignition Temp. (° C.) | 550 | 715 | 830 | 935 | 1020 | 1180 | 1280 | None |
| | $CO_2$ | Mix. ratio (weight %) | 0% | 1.5% | 5% | 10% | 20% | 30% | 40% | 50% |
| | | Ignition Temp. (° C.) | 550 | 705 | 820 | 905 | 1005 | 1160 | 1260 | None |

Example 9

With the equilibrium experimental apparatus composed of an equilibrium apparatus, a tank for recovering refrigerant, and a temperature controller for an equilibrium apparatus, temperature-dependent saturated pressure was measured for the compositions according to the present invention (SR-10 Series). The equilibrium apparatus was composed of an equilibrium cell and a magnetic pump. Sight glass was attached to the equilibrium cell in order to observe inside the cell. The magnetic pump circulated gas and liquid refrigerant acts to from a rapid equilibrium of the composition of refrigerant mixtures. The equilibrium cell and the magnetic pump were installed in a thermostat, the temperature thereof was controlled by a outside temperature controller. As a heat transfer medium of the thermostat, Silicone oil was used. The equilibrium experiment was carried out as follows: the temperature of the thermostat was set to a certain value, and the air inside the refrigerating cycle was removed with vacuum pump such that the pressure thereof was adjusted to $1 \times 10^{-5}$ torr. Liquid compositions of refrigerant mixture were introduced to the equilibrium cell up to ⅓ of its volume. After that, the magnetic pump was operated to mix the compositions and to achieve equilibrium state. Once equilibrium state is achieved, the time-dependent saturated pressure was measured with a temperature sensor and a pressure sensor. The measured saturated pressures between −40–60° C. were summarized in Table 8:

TABLE 8

| Temp. (° C.) | Refrigerant Pressure (kPa) | | | | | |
|---|---|---|---|---|---|---|
| | R22 | R407C | SR-20b | SR-20c | SR-20f | SR-20h |
| 60 | 2434 | 2628.5 | 2440 | 2455 | 2405 | 2426 |
| 55 | 2181 | 2348 | 2203 | 2216 | 2170 | 2189 |
| 50 | 1948 | 2091 | 1985 | 1995 | 1950 | 1968 |
| 45 | 1734 | 1855 | 1780 | 1790 | 1750 | 1764 |
| 40 | 1538 | 1639 | 1592 | 1600 | 1564 | 1576 |
| 0 | 497.7 | 514.3 | 559 | 564 | 542 | 550.6 |
| −20 | 245 | 248 | 285 | 295 | 275 | 285.8 |
| −25 | 201.2 | 202.6 | 238 | 246 | 230 | 238.3 |
| −30 | 163.8 | 163.7 | 198 | 204 | 190 | 197.1 |
| −35 | 132 | 131.1 | 159 | 168 | 157 | 161.5 |
| −40 | 105.2 | 103.7 | 130 | 136.8 | 128 | 131.2 |

As shown in Table 8, the compositions according to the present invention, SR series showed similar vapor pressure characteristics in overall. Although there were some gap in a low temperature region and in the high temperature region, such a gap was proven to be ignorable, compared to R-407C.

INDUSTRIAL APPLICABILITY

The compositions of refrigerant mixture for high back pressure condition according to the present invention can substitute HCFC-22 refrigerant in which the use thereof are highly restricted for being a harmful material to environment according to the Montreal protocol. Further, they can be directly dropped in the refrigerating systems in which HCFC-22 was used as a refrigerant without any systemic change or modification such that the cost required for the manufacture of refrigerating systems could be highly reduced. The advantages of the compositions according to the present invention is as folhighs: a) High evaporating temperature under atmospheric pressure; b) Equal or similar level of condensing/evaporating pressure compared to HCFC-22; c) Excellent latent evaporating heat; d) High condensing point; e) Excellent volumetric cooling capacity; f) High critical temperature; g) Excellent compatibility with the refrigerating oil; h) High viscosity and high heat transferring characteristic; i) Excellent electric insulation property without the deposit of electric insulating material; j) Remarkably increased non-flammability and non-explosiveness; and k) safety to environment and human; l) Direct applicability to the refrigerating systems adopting HCFC-22 refrigerant without any systemic change.

What is claimed is:

1. A refrigerant composition for use in high back pressure condition, containing a refrigerant and an additive, wherein a) the refrigerant is mixture of propane and propylene, the content of the propane is in an amount of 20~45 wt %, the content of the propylene is in an amount of 55~80 wt % and the sum of the propane and the propylene is 100 wt % based on the total weight of the refrigerant, b) the additive is selected from the group consisting carbon dioxide ($CO_2$), trifluoromethyl iodide ($CF_3I$) and mixture thereof, the content of the additive is in an amount of less than 5 wt % based on the refrigerant, and c) the refrigerant composition shows an azeotropic behavior.

2. The refrigerant composition as set forth in claim 1, wherein, based on the total weight of the refrigerant composition, the content of the propane is 32~33 wt %, the content of the propylene is 65~67 wt %, and the content of the additive is 1~2 wt %.

3. A refrigerant composition for use in high back pressure condition, containing a refrigerant and an additive, wherein a) the refrigerant is a mixture of propane and 1,1-difluoroethane, the content of the propane is in amount of 50~70 wt %, the content of the 1,1-difluoroethane is in an amount of 30~50 wt % and the sum of the propane and the 1,1-difluoroethane is 100% based on the total weight of the refrigerant, b) the additive is selected from the group consisting of carbon dioxide ($CO_2$), trifluoromethyl iodide ($CF_3I$) an mixture thereof, the content of the additive is in an amount of less than 5 wt % based on the refrigerant, and c) the refrigerant composition shows an azeotropic behavior.

4. The refrigerant composition as set forth in claim 3, wherein, based on the total weight of the refrigerant composition, the content of the propane is 55~57 wt %, the content of the 1,1-difluoroethane is 41~43 wt % and the content of the additive is 1~2 wt %.

* * * * *